(12) United States Patent
Hosli et al.

(10) Patent No.: US 10,159,239 B2
(45) Date of Patent: Dec. 25, 2018

(54) PACKAGED TERMINAL CLIMATE UNIT FOR PEST CONTROL

(71) Applicant: THERMA-STOR LLC, Madison, WI (US)

(72) Inventors: Wayne J. Hosli, New Orleans, LA (US); Sean M. Ebert, Fitchburg, WI (US)

(73) Assignee: Therma-Stor LLC, Madison, WI (US)

( * ) Notice: Subject to any disclaimer, the term of this patent is extended or adjusted under 35 U.S.C. 154(b) by 342 days.

(21) Appl. No.: 14/923,476

(22) Filed: Oct. 27, 2015

(65) Prior Publication Data

US 2016/0044908 A1  Feb. 18, 2016

Related U.S. Application Data

(63) Continuation of application No. 13/154,196, filed on Jun. 6, 2011, now Pat. No. 9,247,725.

(51) Int. Cl.
*A01M 1/20* (2006.01)
*A01M 19/00* (2006.01)
(Continued)

(52) U.S. Cl.
CPC ........... *A01M 1/2072* (2013.01); *A01M 1/20* (2013.01); *A01M 1/2077* (2013.01);
(Continued)

(58) Field of Classification Search
CPC ....... A01M 1/20; A01M 1/2094; A01M 19/00
(Continued)

(56) References Cited

U.S. PATENT DOCUMENTS

| 3,807,083 A | 4/1974 | Smith et al. |
| 4,311,190 A * | 1/1982 | Walley ............ F24D 5/12 165/265 |

(Continued)

FOREIGN PATENT DOCUMENTS

| GB | 2 280 851 A | 2/1995 |
| KR | 2009121777 A | 11/2009 |

OTHER PUBLICATIONS

LG Packaged Terminal Air Conditioner/Heat Pump Service Manual, LG Electronics Inc., http://www.lgservice.com, 59 pages, dated Feb. 2007.

(Continued)

*Primary Examiner* — Darren W Ark
(74) *Attorney, Agent, or Firm* — Baker Botts L.L.P.

(57) ABSTRACT

In certain embodiments, a packaged terminal device for killing pests in an affected area includes a housing configured to be positioned at least partially within an affected area, a fan positioned within the housing, and one or more heating elements positioned within the housing. The fan is operable to draw a flow of air from the affected area into the housing. The one or more heating elements are operable to generate heated air by transferring heat to the flow of air. The packaged terminal device further includes a control unit operable to control the operation of the one or more heating elements in order to cause the packaged terminal device to operate in either a first mode or a second mode. In the first mode, the operation of the one or more heating elements is controlled such that sufficient heated air is generated to heat at least a portion of the affected area to a temperature less than or equal to a first predefined temperature. In the second mode, the operation of the one or more heating elements is controlled such that sufficient heated air is generated to heat at least a portion of the affected area to a temperature greater (Continued)

than or equal to a second predefined temperature, the second predefined temperature being greater than the first predefined temperature.

19 Claims, 2 Drawing Sheets

(51) Int. Cl.
  *A01M 1/24*     (2006.01)
  *A01M 1/22*     (2006.01)
  *E05B 49/00*     (2006.01)
  *E05B 63/00*     (2006.01)
  *E05B 65/00*     (2006.01)
  *F24H 3/02*     (2006.01)
(52) U.S. Cl.
  CPC ............ *A01M 1/2094* (2013.01); *A01M 1/22* (2013.01); *A01M 1/24* (2013.01); *A01M 19/00* (2013.01); *E05B 49/00* (2013.01); *E05B 63/0004* (2013.01); *E05B 65/0014* (2013.01); *F24H 3/022* (2013.01)
(58) Field of Classification Search
  USPC ........................................ 43/132.1, 124, 144
  See application file for complete search history.

(56) References Cited

U.S. PATENT DOCUMENTS

| | | | | |
|---|---|---|---|---|
| 4,352,349 A * | 10/1982 | Yoho | .................... | F24C 15/2021 126/299 R |
| 4,637,223 A * | 1/1987 | Hosoya | .................... | F24F 1/027 62/263 |
| 4,817,329 A * | 4/1989 | Forbes | ................... | A01M 1/2094 43/124 |
| 4,953,320 A | 9/1990 | Nelson | | |
| 4,958,456 A | 9/1990 | Chaudoin et al. | | |
| 4,961,283 A * | 10/1990 | Forbes | ................. | A01M 1/2094 43/124 |
| 5,131,455 A * | 7/1992 | Tsuchiyama | ............ | F24F 1/027 165/240 |
| 5,152,336 A * | 10/1992 | Wollaber | ................ | F24F 1/027 165/122 |
| 5,203,400 A * | 4/1993 | Tsunekawa | ............. | F24F 1/027 165/122 |
| 5,295,531 A * | 3/1994 | Tsunekawa | ............. | F24F 13/20 165/48.1 |
| 5,335,721 A * | 8/1994 | Wollaber | ................ | F24F 1/027 165/122 |
| 5,365,692 A | 11/1994 | Gustafson | | |
| 5,372,189 A * | 12/1994 | Tsunekawa | ............. | F24F 1/027 165/59 |
| 5,471,782 A | 12/1995 | Brittell | | |
| 5,819,840 A * | 10/1998 | Wilson | ............... | G05D 23/1902 165/11.1 |
| 5,867,935 A | 2/1999 | Brown | | |
| 5,974,726 A | 11/1999 | Creeger et al. | | |
| 6,141,901 A * | 11/2000 | Johnson | ............... | A01M 1/2094 43/124 |
| 6,146,600 A * | 11/2000 | Williamson | ......... | A23B 7/0053 422/1 |
| 6,171,561 B1 * | 1/2001 | Williamson | ......... | A23B 7/0053 422/1 |
| 6,182,453 B1 | 2/2001 | Forsberg | | |
| 6,327,812 B1 * | 12/2001 | Hedman | ............ | A01M 1/2094 43/124 |
| 6,447,737 B1 * | 9/2002 | Williamson | ......... | A23B 7/0053 422/1 |
| 6,581,324 B1 | 6/2003 | Creeger et al. | | |
| 6,588,140 B1 * | 7/2003 | Johnson | ............... | A01M 1/2094 43/124 |
| 6,588,864 B1 | 7/2003 | Moretti | | |
| 6,595,200 B1 * | 7/2003 | Dai | ....................... | F24H 3/0488 126/110 B |
| 6,612,067 B2 * | 9/2003 | Topp | ..................... | A01M 19/00 422/307 |
| 6,658,882 B2 * | 12/2003 | Ohama | ................... | F24F 1/027 415/208.1 |
| 6,679,482 B2 | 1/2004 | Allenbaugh | | |
| 6,681,760 B2 * | 1/2004 | Topp | ....................... | F23D 14/00 126/110 B |
| 6,772,829 B2 * | 8/2004 | Lebrun | ................... | F28D 1/024 165/121 |
| 6,880,549 B2 * | 4/2005 | Topp | ....................... | F23D 14/00 126/110 B |
| 6,884,065 B2 * | 4/2005 | Vandrak | ................. | F24C 3/042 126/110 B |
| 6,892,491 B2 * | 5/2005 | Hedman | ............. | A01M 1/2094 43/124 |
| 6,940,051 B2 * | 9/2005 | Tateishi | ................ | F24H 9/2071 219/486 |
| 7,100,540 B2 | 9/2006 | Vaughan | | |
| 7,182,805 B2 | 2/2007 | Reaves | | |
| 7,469,500 B2 * | 12/2008 | Lovelace | .............. | A01M 17/00 219/486 |
| 7,532,810 B2 * | 5/2009 | Jayaram | ................ | F24H 3/0417 34/266 |
| 7,690,148 B2 * | 4/2010 | Hedman | ............. | A01M 1/2094 43/132.1 |
| 7,712,249 B1 * | 5/2010 | Modlin | ................. | A01M 1/205 239/102.2 |
| 7,784,293 B2 | 8/2010 | Violand et al. | | |
| 7,793,513 B2 | 9/2010 | Aldridge et al. | | |
| 7,802,615 B2 * | 9/2010 | Martinus | ................. | F24F 1/027 165/122 |
| 7,926,222 B2 * | 4/2011 | Molnar | ............... | A01M 1/2094 43/124 |
| 8,221,678 B2 * | 7/2012 | Hedman | ................... | A61L 2/06 34/100 |
| 8,256,135 B2 * | 9/2012 | Hedman | ............. | A01M 1/2094 34/381 |
| 8,272,143 B1 * | 9/2012 | Hedman | ................... | A61L 2/06 34/100 |
| 8,316,660 B2 * | 11/2012 | DeMonte | ................. | F24F 1/04 62/272 |
| 8,347,640 B2 * | 1/2013 | DeMonte | ................. | F24F 1/04 62/93 |
| 8,388,222 B2 * | 3/2013 | Potter | ................. | A01M 1/2094 374/102 |
| 8,479,439 B2 * | 7/2013 | DeMonte | ............ | A01M 1/2094 126/110 B |
| 8,479,440 B2 * | 7/2013 | DeMonte | ............ | A01M 1/2094 126/110 B |
| 8,499,489 B2 * | 8/2013 | Hedman | ............. | A01M 1/2094 43/124 |
| 8,720,109 B2 * | 5/2014 | O'Brien | ............... | A01M 1/2094 43/132.1 |
| 8,726,539 B2 * | 5/2014 | Potter | ....................... | F26B 9/02 165/54 |
| 8,756,857 B2 * | 6/2014 | DeMonte | ............ | A01M 1/2094 43/132.1 |
| 8,757,506 B2 * | 6/2014 | Zhou | ....................... | F24F 1/027 236/44 C |
| 9,204,494 B2 * | 12/2015 | Lafleur | ................... | H05B 1/028 |
| 9,237,742 B2 * | 1/2016 | O'Brien | ............... | A01M 1/2094 |
| 9,247,725 B2 * | 2/2016 | Hosli | ...................... | A01M 1/20 |
| 9,339,021 B2 * | 5/2016 | Lander | ................ | A01M 1/2088 |
| 9,374,991 B2 * | 6/2016 | O'Brien | ............... | A01M 1/2094 |
| 9,459,022 B2 * | 10/2016 | Krupp | ..................... | F24H 3/025 |
| 9,578,867 B2 * | 2/2017 | O'Brien | ............... | A01M 1/2094 |
| 9,807,994 B2 * | 11/2017 | O'Brien | ............... | A01M 1/2094 |
| 9,930,878 B2 * | 4/2018 | O'Brien | ............... | A01M 1/2094 |
| 2003/0029605 A1 | 2/2003 | Lebrun | | |
| 2003/0061757 A1 | 4/2003 | Askin | | |
| 2005/0246942 A1 * | 11/2005 | Mueller | ............. | A01M 1/2094 43/124 |
| 2005/0268543 A1 | 12/2005 | Hicks et al. | | |

(56) References Cited

U.S. PATENT DOCUMENTS

| | | | | |
|---|---|---|---|---|
| 2007/0023980 A1* | 2/2007 | Abaraw | .............. | A01M 1/2094 266/252 |
| 2007/0084105 A1* | 4/2007 | Lindsay | .............. | A01M 1/2094 43/129 |
| 2007/0258853 A1 | 11/2007 | Burton | | |
| 2008/0260364 A1* | 10/2008 | Vandrak | ................ | F24H 3/0488 392/365 |
| 2012/0204478 A1* | 8/2012 | Gere | ................... | A01M 1/2094 43/132.1 |
| 2012/0233907 A1* | 9/2012 | Pattison | .............. | A01M 1/2094 43/124 |
| 2012/0324928 A1* | 12/2012 | Durham | ............. | G05B 13/0205 62/129 |
| 2013/0008423 A1* | 1/2013 | Noble | ................... | F24H 3/0488 126/116 C |
| 2013/0055735 A1* | 3/2013 | DeMonte | ................. | F24F 1/04 62/89 |
| 2013/0298579 A1* | 11/2013 | Dingle | ................. | F24F 3/1405 62/90 |
| 2015/0128483 A1 | 5/2015 | Knupp | | |

OTHER PUBLICATIONS

Canadian Intellectual Property Office, Office Action and Examination Search Report for Application Serial No. 2,775,279, 6 pages, dated Dec. 9, 2014.

* cited by examiner

PACKAGED TERMINAL CLIMATE UNIT FOR PEST CONTROL

RELATED APPLICATIONS

This is a continuation of U.S. Ser. No. 13/154,196 filed Jun. 6, 2011, entitled "Package Terminal Climate Unit for Pest Control," the entire disclosure of which is hereby incorporated by reference.

TECHNICAL FIELD

This invention relates generally to pest control and more particularly to a packaged terminal unit for thermal pest control in an affected area.

BACKGROUND

It is not uncommon for pests, such as bed bugs and other insects, to infest structures or other areas that are also inhabited or otherwise used by humans. This is particularly true in enclosed spaces that are located within certain climates and/or enclosed spaces that are frequented by the public. The insects, which generally hide during the day, emerge from cracks and crevices at night to feast on human blood while the human inhabitants are asleep. For example, hotels may become infested with bed bugs or other pests when those insects are brought in by overnight guests. The problem is not isolated to hotels that service overnight visitors, however. Other spaces that may become infested include office and commercial buildings, private dwellings, and vehicles. Accordingly, the need exists for effective and efficient systems and methods for killing bed bugs and/or other pests within an enclosed area. Systems and methods for killing bed bugs and/or other pests, however, have proven inadequate in various respects.

SUMMARY

According to embodiments of the present disclosure, disadvantages and problems associated with previous systems for killing pests in an affected area may be reduced or eliminated.

In certain embodiments, a packaged terminal device for killing pests in an affected area includes a housing configured to be positioned at least partially within an affected area, a fan positioned within the housing, and one or more heating elements positioned within the housing. The fan is operable to draw a flow of air from the affected area into the housing. The one or more heating elements are operable to generate heated air by transferring heat to the flow of air. The packaged terminal device further includes a control unit operable to control the operation of the one or more heating elements in order to cause the packaged terminal device to operate in either a first mode or a second mode. In the first mode, the operation of the one or more heating elements is controlled such that sufficient heated air is generated to heat at least a portion of the affected area to a temperature less than or equal to a first predefined temperature. In the second mode, the operation of the one or more heating elements is controlled such that sufficient heated air is generated to heat at least a portion of the affected area to a temperature greater than or equal to a second predefined temperature, the second predefined temperature being greater than the first predefined temperature.

Particular embodiments of the present disclosure may provide one or more technical advantages. For example, the packaged terminal device of the present disclosure may be a suitable replacement for a conventional packaged terminal device often installed in certain affected areas (e.g., a packaged terminal air conditioner (PTAC) or a packaged terminal heat pump (PTHP) often installed in hotel rooms). Because the packaged terminal device of the present disclosure operates in both a first mode and a second mode, the packaged terminal device may be safely used to both (1) heat (or cool) an affected area to a temperature comfortable for occupants of the affected area (e.g., 70 degrees Fahrenheit), and (2) heat the affected area to a temperature sufficient to kill bed bugs and other pests (e.g., 120 degrees Fahrenheit). In contrast, conventional packaged terminal devices may only be operable to heat/cool an affected area to a temperature comfortable for occupants of the area (e.g., 70 degrees Fahrenheit). As a result, when the packaged terminal device of the present disclosure is installed in an affected area as a replacement for a conventional packaged terminal device, the need to bring in a separate heating device (e.g., a hydronic heating system) to heat the affected area to a temperature sufficient to kill bed bugs and other pests (e.g., 120 degrees Fahrenheit) may be reduced or eliminated. Accordingly, the cost of pest eradication and/or the time required for pest eradication may be reduced.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION

Figure 1:
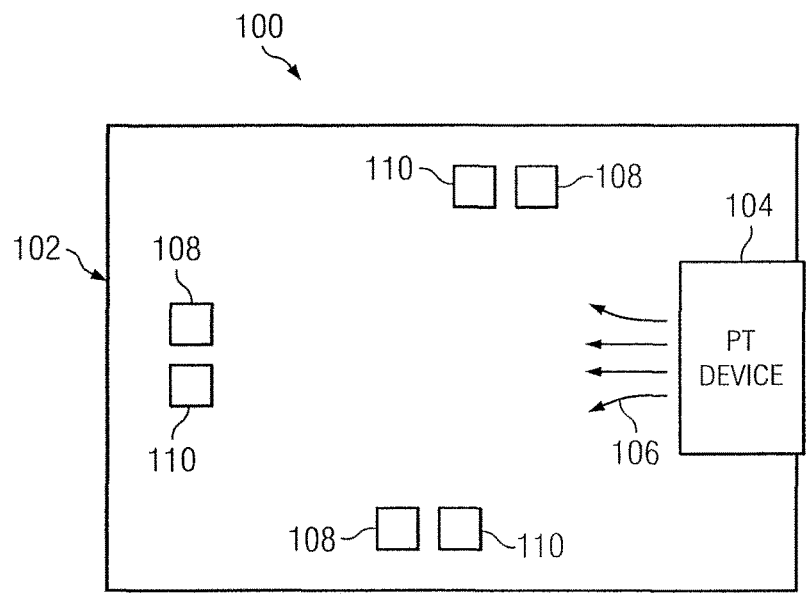
FIG. 1 illustrates an example system for thermal pest control in an affected area, according to certain embodiments of the present disclosure.

FIG. 1 illustrates an example system 100 for thermal pest control in an affected area 102, according to certain embodiments of the present disclosure. System 100 may include a packaged terminal (PT) device 104 positioned at least partially within affected area 102 (e.g., mounted in an exterior wall 208 of affected area 102, as described below with Regard to FIG. 2). PT device 104 may be configured to operate in (1) a first, normal mode in which PT device 104 is operable to discharge sufficient heated air 106 into affected area 102 to heat affected area 102 to a temperature comfortable for occupants of affected area 102 (e.g., a temperature in the range of 60-80 degrees Fahrenheit), and (2) a second, pest control mode in which PT device 104 is operable to discharge sufficient heated air 106 into affected area 102 to heat affected area 102 to a temperature sufficient to kill bed bugs and other pests that may be present in affected area 102. For example, a temperature of approximately 120 degrees Fahrenheit may be sufficient to kill bed bugs and/or other pests. In certain embodiments, however, it may be desirable to raise the air temperature within affected area 102 to a temperature greater than 120 degrees Fahrenheit (e.g., approximately 140 degrees Fahrenheit) in order to ensure that the contents within affected area 102 are adequately and thoroughly heated to a target temperature (e.g., 120 degrees Fahrenheit).

Affected area 102 may include any site where bedbugs or other pests may nest, including where there has been visual confirmation of a nesting area of bedbugs or other pests, or where a trained animal (e.g., a scent detection dog) has alerted to the presence of bedbugs or other pests (i.e., an acute infestation site). In certain embodiments, affected area 102 may include all or a portion of a building or structure, such as an apartment within an apartment building, a hotel, an office space, a commercial building, a private dwelling (e.g., a house), or any other suitable enclosed space where an infestation is suspected. As one particular example, affected area 102 may comprise a hotel room, and PT device 104 may be installed in the hotel room in order to provide both air conditioning for the hotel room (e.g., heating and cooling) when operating in a first mode and thermal pest control for the hotel room (e.g., by heating the hotel room to a temperature sufficient to kill bed bug and other pest) when operating in a second mode.

In certain embodiments, system 100 may include one or more air movers 108 positioned within the affected area 102. Air movers 108 may distribute the heated air 106 discharged by PT device 104 throughout affected area 102. Air movers 108 may include standard propeller type fans or any other suitable devices for producing a current of air that may be used to circulate heated air 106 and, in some embodiments, reduce the concentration of heated air 106 in a particular location, such as at or near the ceiling of affected area 102. Although FIG. 1 depicts a particular number of air movers 108 positioned within affected area 102, any suitable number of air movers 108 may be selectively positioned within affected area 102 to promote the circulation of heated air 106 through affected area 102, as desired. For example, air movers 108 may be positioned within affected area 102 such that a desired airflow pattern (e.g., clock-wise or counterclockwise) is achieved.

In certain embodiments, the output side of an air mover 108 may be configured to direct heated air 106 toward hard to heat areas and/or contents of affected area 102. For example, affected area 102 may include an exterior wall, the outside of which may be exposed to cold outside temperatures. As a result, the exterior wall may be harder to heat than certain other portions of affected area 102. An air mover 108 may therefore be positioned to direct heated air 106 toward the exterior wall in order to more effectively heat the exterior wall. In certain embodiments, the output side of air mover 108 may be configured to direct heated air 106 along the floor of affected area 102 to further aid in the circulation of heated air 106 and prevention of temperature stratification (as it is generally recognized that heated air 106 will rise as it exits heating unit 104). For example, the configuration of output side of air mover 108 may be such that heated air 106 is directed towards the baseboards or floor of affected area 102. In certain embodiments, the output side of air mover 108 may include a modified circle that includes on elongated corner configured to direct air in a generally downward direction. An example of such an air mover may be that sold under the name Phoenix Axial Air Mover with FOCUS™ Technology or Quest Air AMS 30 by Therma-Stor, L.L.C., which is described in U.S. Pat. No. 7,331,759 issued Marco A. Tejeda and assigned to Technologies Holdings Corp. of Houston, Tex.

Additionally, because some items or areas within affected area 102 may be considered hard to heat, additional measures may be taken to ensure thorough distribution of heat through affected area 102 and its infested contents. For example, tightly packed contents within affected area 102, which may be resistant to being heated completely throughout (e.g., contents within closets and drawers, stacked articles such as clothing or towels, etc.) may be separated such that each item may be sufficiently enveloped in the heat emitted from heating unit 104. As a result, heated air 106 may more easily penetrate such items to ensure that bed bugs and/or others pest therein are killed.

In certain embodiments, system 100 may include one or more temperature probes 110 positioned within the affected area 102. Temperature probes 110 may be operable to measure the temperature within affected area 102. When PT device 104 is operating in a pest control mode (i.e., a mode in which the goal is to heat affected area 102 and its contents to a temperature sufficient to kill bed bugs and other pests), temperature probes 110 may be used to help ensure that the areas of affected area 102 in which they are placed reach a target temperature (e.g., 120 degrees Fahrenheit). In certain embodiments, one or more temperature probes 110 may be communicatively coupled to PT device 104 (e.g., via wireless or wireline communication) such that the operation of PT device 104 may be controlled according to the temperatures detected by the one or more temperature probes 110 (as described in further detail below).

Although a particular implementation of system 100 is illustrated and primarily described, the present disclosure contemplates any suitable implementation of system 100, according to particular needs. Moreover, although various components of system 100 have been depicted as being located at particular positions within affected area 102, the present disclosure contemplates those components being positioned at any suitable location, according to particular needs.

Figure 2:
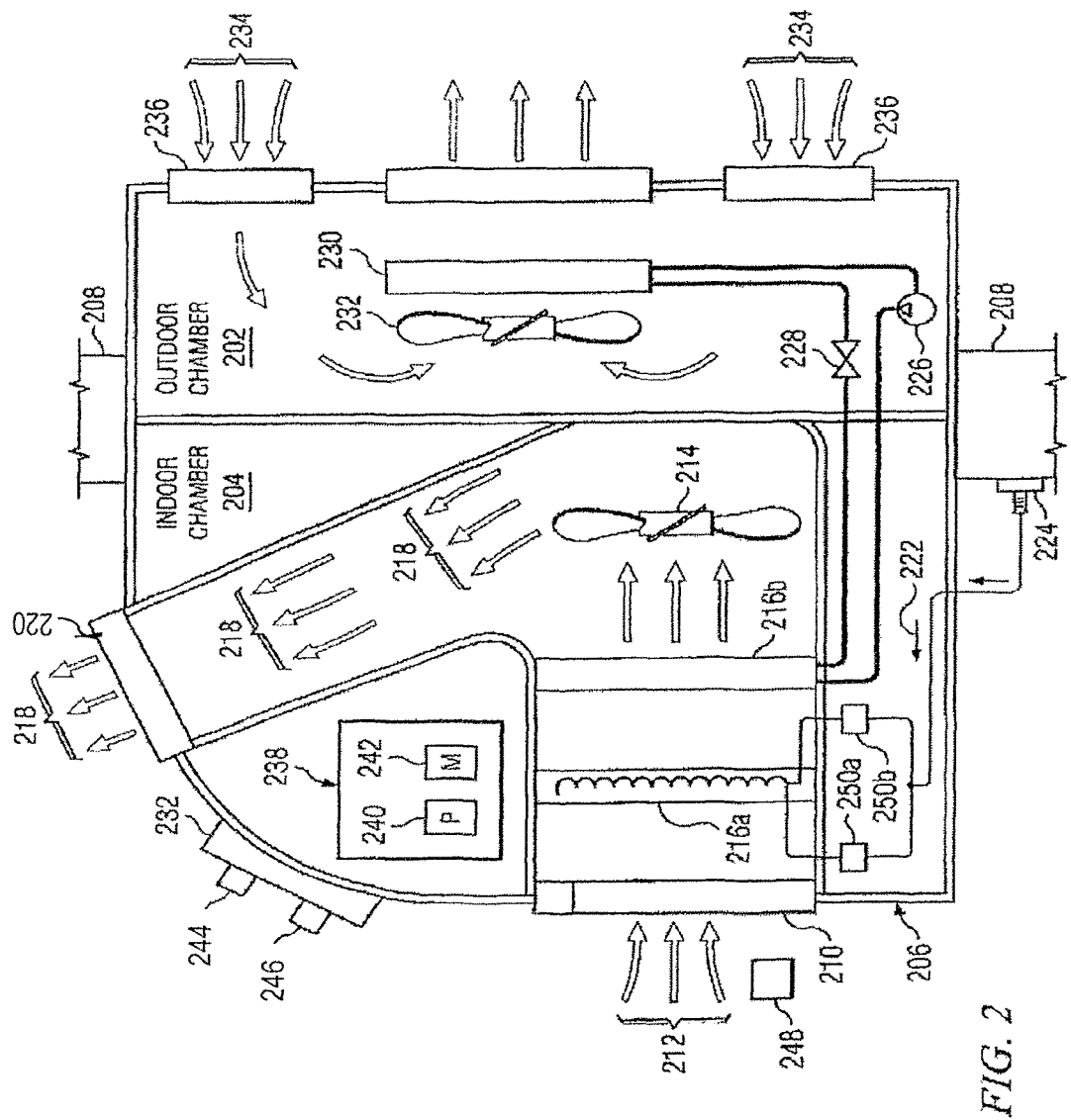
FIG. 2 illustrates a detailed view of an example packaged terminal device for thermal pest control, according to certain embodiments of the present disclosure.

FIG. 2 illustrates a detailed view of an example PT device 104 for thermal pest control, according to certain embodiments of the present disclosure. In certain embodiments, PT device 104 may be installed in an opening of an exterior wall 208 of affected area 102 (e.g., a hotel room). In such embodiments, PT device 104, may include an outdoor chamber 202 and an indoor chamber 204, outdoor chamber 202 and indoor chamber 204 being encompassed within a housing 206 installed in the opening in exterior wall 208 of affected area 102.

In certain embodiments, an air inlet 210 may be formed in housing 206 such that indoor chamber 204 may receive an air flow 212 from affected area 102. In certain embodiments, air flow 212 may be drawn through air inlet 210 by a fan 214. Fan 214 may include any suitable component operable to draw air flow 212 from affected area 102 at a particular flow rate. For example, fan 214 may include a fan having a variable speed electric motor such that the flow rate of air flow 212 may be varied by altering the speed of the electric motor (e.g., in response to a user input)

In certain embodiments, the air flow 212, having been drawn into indoor chamber 204 via air inlet 210, may pass across one or more heating elements 216. Heating elements 216 may transfer heat to air flow 212 in order to generate heated air 218. Heated air 218 may be discharged into affected area 102 via an air outlet 220 in order to heat affected area 102 to a desired temperature.

In certain embodiments, the one or more heating elements 216 may include one or more electrical resistance heaters 216a. For purposes of simplicity, a single electrical resistance heater 216a is depicted and described below. Electrical resistance heater 216a may include any suitable element operable to receive a current flow 222 from a power source 224 and generate heat as the current flow 222 passes through a resistive element.

In certain embodiments, the one or more heating elements 216 may include a heat exchanger 216b. For example, heat exchanger 216b may be an indoor heat exchanger component of a refrigeration loop additionally including a compressor 226, an expansion valve 228, and an outdoor heat exchanger 230. When the refrigeration loop is operated as a heat pump for providing heat to air flow 212 (i.e., a reverse refrigeration cycle), heat exchanger 216b may be considered the condenser component of the refrigeration loop. When operated in this manner, a refrigerant is pressurized by compressor 226, causing the refrigerant to become a high pressure, high temperature gas. The heated, gaseous refrigerant is discharged to heat exchanger 216b (i.e., the condenser) where it condenses into a high pressure, moderate temperature liquid, thereby transferring heat to the air flow 212 passing across heat exchanger 216b. The condensed refrigerant then passes through expansion valve 228, which lowers the pressure of the refrigerant. The low pressure, liquid refrigerant leaving expansion valve 228 enters outdoor heat exchanger 230 (i.e., the evaporator). A fan 232 may draw external air 234 to outdoor chamber 202 via vents 236 such that the external air 234 passes across outdoor heat exchanger 230 (i.e. the evaporator). The refrigerant may absorb heat from the external air 234, the absorbed heat causing the liquid refrigerant to again enter the gaseous state. The gaseous refrigerant is then passed back to the compressor, and the cycle is repeated.

In certain embodiments, the above-discussed refrigeration loop may include a reversing valve that allows the loop to be operated in reverse of that discussed above. When the refrigeration loop is operated in reverse, heat exchanger 216b may act as the evaporator component (with outdoor heat exchanger acting as the condenser component) such that heat may be drawn away from air flow 212 in order to cool affected area 102.

Although heat exchanger 216b is depicted and primarily described as being a condenser component of a refrigeration loop that is operable to generate heat when the refrigeration loop is operated in reverse (i.e., such that the condenser component acts as a heat pump), the present disclosure contemplates any suitable heat exchanger 216b, according to particular needs. For example, heat exchanger 216b may be operable to transfer heat from hot water received from a hot water source (e.g., a boiler unit or other suitable water heater) to air passing across heat exchanger 216b. As another example, heat exchanger 216b may be operable to transfer heat from steam received from a steam supply to air passing across heat exchanger 216b.

Additionally, although the PT device 104 is depicted as including both an electrical resistance heater 216a and a heat exchanger 216b, the present disclosure contemplates PT device 104 including either (1) only an electrical resistance heater 216a (or multiple electrical resistance heaters 216a), or (2) only a heat exchanger 216b (or multiple heat exchangers 216b)

In certain embodiments, one or more of the above-discussed components of PT device 104 (e.g., fan 214, electrical resistance heater 216a, heat exchanger 216, or any other suitable component of PT device 104) may be communicatively coupled (e.g., via wireless or wireline communication) to control unit 238, which may control certain aspects of the above-discussed operation of those components. Control unit 238 may include any suitable combination of software, firmware, and hardware.

Control unit 238 may include one or more processing modules 240. Processing modules 240 may each include one or more microprocessors, controllers, or any other suitable computing devices or resources and may work, either alone or with other components of PT device 104, to provide a portion or all of the functionality described herein. Control unit 238 may additionally include (or be communicatively coupled to via wireless or wireline communication) memory 242. Memory 242 may include any memory or database module and may take the form of volatile or non-volatile memory, including, without limitation, magnetic media, optical media, random access memory (RAM), read-only memory (ROM), removable media, or any other suitable local or remote memory component.

In certain embodiments, control unit 238 may be operable to cause PT device 104 to operate in either a first, normal mode of operation (e.g., a mode according to which air within affected area 102 is conditioned such that it is suitable for occupants) or a second, pest control mode of operation (e.g., a mode according to which air within affected area 102 is heated to a temperature sufficient to kill bed bugs and other pests). For example, control unit 238 may be communicatively coupled to an override selector 244 that allows a user to specify the mode of operation for PT device 104 (i.e., either the normal mode of operation or the pest control mode of operation).

In certain embodiments, override selector 244 may include a mechanical override button that a user may push in order to select the pest control mode of operation. However, because the pest control mode of operation may allow affected area 102 to be heated to temperatures than may be unsafe for human occupants, override selector 244 may be secured from occupant of affected area 102. For example, override selector 244 may be a lock that requires a key in order to select the pest control mode of operation. As another example, override selector 244 may include an electronic key pad that requires a special key combination or other code to be entered order to select the pest control mode of operation. As yet another example, override selector 244 may be located on the interior of PT device 104 such that it is hidden from the occupants of affected area 102 or may not be located on PT device 104 at all (e.g., the pest control mode of operation may be selected remotely, such as by hotel personnel).

When override selector 244 is set such that PT device 104 is operating in a normal mode of operation, control unit 238 may control one or more components of PT device 104 (e.g., fan 214, electrical resistance heater 216a, heat exchanger 216b, or any other suitable component of PT device 104) such that air flow 212 is conditioned according to user preferences. In certain embodiments, PT device 104 may include user controls 246 which allow a user to specify a desired temperature within affected area 102. Based on temperature measurements received by control unit 238 from a thermostat 248, control unit 238 may control one or more components of PT device 104 (e.g., fan 214, electrical resistance heater 216a, heat exchanger 216, or any other suitable component of PT device 104) in order to achieve the desired temperature.

Because the normal mode of operation is a mode according to which air within affected area 102 is conditioned such that it is suitable for occupants, one or more safety limits may be imposed on the operation of PT device 104 when operating in normal mode.

For example, PT device 104 may be prevented from heating air within affected area 102 above a maximum temperature deemed safe and/or necessary for occupants of affected area 102 (e.g., 90 degrees Fahrenheit). More specifically, control unit 238 may shut down one or more one or more components of PT device 104 (e.g., fan 214, electrical resistance heater 216a, heat exchanger 216b, or any other suitable component of PT device 104) in response to receipt of a signal from thermostat 248 indicating that the temperature within affected area 102 is greater than the specified temperature.

As another example, when PT device 104 is operating in normal mode, the current flow 222 received by electrical resistance heater 216a may pass through a fuse 250a that limits the current flow 222 to a specified amount, thereby limiting the temperature that the resistive element of electrical resistance heater 216a may reach. Limiting the temperature that the resistive element of electrical resistance heater 216a may reach may both (1) reduce the fire hazard associated with electrical resistance heater 216a, and (2) prevent PT device 104 from heating air within affected area 102 above a maximum temperature deemed safe and/or necessary for occupants of affected area 102 (e.g., 90 degrees Fahrenheit).

When override selector 244 is set such that PT device 104 is operating in a pest control mode of operation, control unit 238 may control one or more components of PT device 104 (e.g., fan 214, electrical resistance heater 216a, heat exchanger 216b, or any other suitable component of PT device 104) such that air flow 212 is heated to a temperature sufficient to kill bed bugs and other pests. Because the temperature sufficient to kill bed bugs and other pests (e.g., 120 degrees Fahrenheit) is higher than the above discussed maximum temperature deemed safe and/or necessary for occupants of affected area 102 (e.g., 90 degrees Fahrenheit), one or more of the above-discussed safety limits may be overridden when PT device 104 is operating in a pest control mode of operation.

For example, PT device 104 may be allowed to heat air within affected area 102 above the specified temperature deemed safe and/or necessary for occupants of affected area 102 (e.g., 90 degrees Fahrenheit) such that affected area 102 may reach a temperature sufficient to kill bed bugs and other pests (e.g., 120 degrees Fahrenheit). Moreover, in embodiments in which temperature probes 110 are placed within affected area 102, temperature probes 110 may communicate signals to control unit 238, the signals indicating the temperature within affected area 102. Based on this temperature feedback, control unit 238 may selectively control one or more one or more components of PT device 104 (e.g., fan 214, electrical resistance heater 216a, heat exchanger 216, or any other suitable component of PT device 104) to help ensure that affected area 102 is uniformly heated to a temperature sufficient to kill bed bugs and other pests (e.g., 120 degrees Fahrenheit).

As another example, when PT device 104 is operating in pest control mode, the current flow 222 received by electrical resistance heater 216a may pass through a fuse 250b that limits the current flow 222 to an amount greater than that permitted by fuse 250a, thereby allowing the resistive element of electrical resistance heater 216a to reach a higher temperature. Allowing the resistive element of electrical resistance heater 216a to reach a higher temperature may increase the overall heating capacity of PT device 104, which may allow PT device 104 to heat affected area 102 to a temperature sufficient to kill bed bugs and other pests (e.g., 120 degrees Fahrenheit), which may not be possible based on the limits imposed by fuse 250a.

The ability of PT device 104 to operate in both a normal mode and a pest control mode may provide certain advantages over conventional packaged terminal device often installed in certain affected areas (e.g., a PTAC or a PTHP often installed in hotel rooms). For example, as discussed above, PT device 104 may be safely used to both (1) heat (or cool) an area to a temperature comfortable for occupants of the area (e.g., 70 degrees Fahrenheit), and (2) heat the area to a temperature sufficient to kill bed bugs and other pests (e.g., 120 degrees Fahrenheit). In contrast, convention packaged terminal devices may only be operable to heat/cool an area to a temperature comfortable for occupants of the area (e.g., 70 degrees Fahrenheit). As a result, when PT device 104 is installed in an affected area as a replacement for a conventional packaged terminal device, the need to bring in a separate heating device (e.g., a hydronic heating system) to heat the affected area to a temperature sufficient to kill bed bugs and other pests (e.g., 120 degrees Fahrenheit) may be reduced or eliminated. Accordingly, the cost of pest eradication and/or the time required for pest eradication may be reduced.

Although a particular implementation of PT device 104 is illustrated and primarily described, the present disclosure contemplates any suitable implementation of PT device 104, according to particular needs. Moreover, although various components of PT device 104 have been depicted as being located at particular positions within housing 206 and relative to one another, the present disclosure contemplates those components being positioned at any suitable location, according to particular needs.

Figure 3:
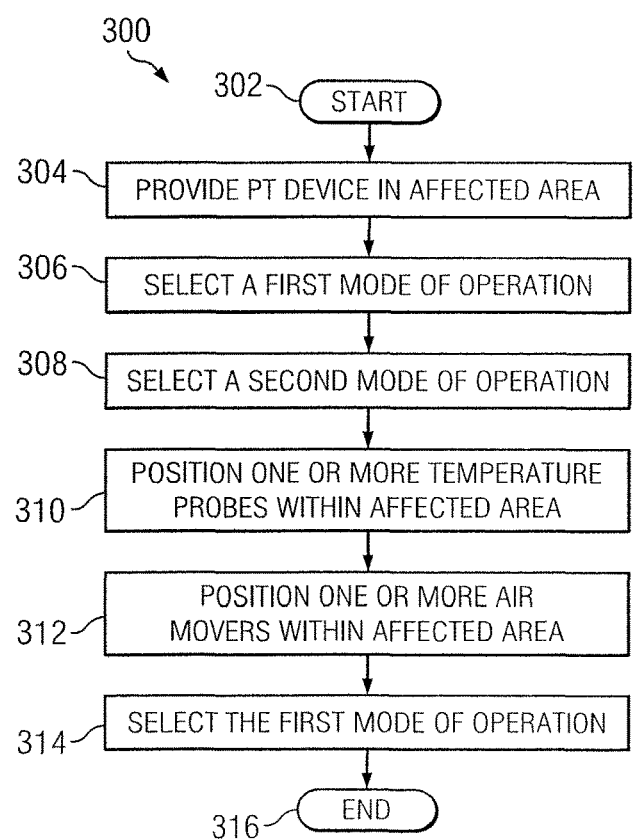
FIG. 3 illustrates an example method for thermal pest control using the example packaged terminal device depicted in FIG. 2, according to certain embodiments of the present disclosure.

FIG. 3 illustrates an example method 300 for thermal pest control using PT device 104, according to certain embodiments. The method begins at step 302. At step 304, a PT device 104 may be provided at least partially within affected area 102. For example, PT device 104 may be installed in an exterior wall of a hotel room. As described above with regard to FIG. 2, PT device 104 may be operable to operable in both (1) a normal mode in which PT device 104 is operable to generate sufficient heated air 218 to heat at least a portion of affected area 102 to a temperature suitable for occupants of affected area (e.g., a temperature less than 90 degrees Fahrenheit), and (2) a cleaning mode in which the PT device 104 is operable to generate sufficient heated air 218 to heat at least a portion of the affected area 102 to a temperature sufficient to kill bed bugs or other pests (e.g., a temperature greater than 120 degrees Fahrenheit).

At step 306, a user selects, using override selector 244 of PT device 104, the normal mode of operation. When the normal mode of operation is selected, PT device 104 may operate with one or more safety limits in place such that PT device 104 may safely provide heated air 218 to affected area 102 while one or more occupants are located in affected area 102 (i.e., PT device 104 may heat affected area to a temperature specified by the occupants of affected area 102).

At step 308, a user selects, using override selector 244 of PT device 104, the pest control mode of operation. When the pest control mode of operation is selected, the one or more safety limits associated with the normal mode may be overridden such that PT device may heat affected area 102 to a temperature sufficient to kill bed bugs and other pests (e.g., 120 degrees Fahrenheit). At step 310, one or more temperature probes 110 are positioned within affected area 102. Temperature probes 110 may each be operable to detect the temperature within affected area 110 and communicate a signal indicating the detected temperature to control unit 238 of PT device 104 such that PT device 104 may operate until affected area 102 has been thoroughly and uniformly heated to a target temperature (e.g., 120 degrees Fahrenheit). At step 312, one or more air movers 108 are positioned within the affected area 102. Air movers 108 may distribute the heated air 106 discharged by PT device 104 throughout affected area 102.

Once affected area has been heated to a temperature sufficient to kill bed begs an other pests for a sufficient period of time, a user, at step 314, may again select, using override selector 244 of PT device 104, the normal mode of operation such that PT device may heat affected area 102 to a temperature specified by the occupants of affected area 102. The method ends at step 316.

Although the steps of method 300 have been described as being performed in a particular order, the present invention contemplates that the steps of method 300 may be performed in any suitable order, according to particular needs Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for killing pests in an affected area, comprising:
    draw, by a first fan positioned within an indoor chamber of a housing, a first flow of air from within an affected area into the indoor chamber of the housing;
    draw, by a second fan positioned within an outdoor chamber of the housing, a second flow of air from an area outside the affected area into the outdoor chamber of the housing;
    generate, by one or more heating elements within the indoor chamber of the housing, heated air by transferring heat to the first flow of air;
    operate in a first mode of operation, a control unit causes electric current to be supplied to the one or more heating elements to generate a sufficient amount of heated air to heat at least a portion of the affected area to a temperature less than or equal to a first predefined temperature; and
    operate in a second mode of operation, the control unit causes electric current to be supplied to the one or more heating elements to generate an additional amount of heated air to heat the at least a portion of the affected area to a temperature that is greater than or equal to a second predefined temperature, the second predefined temperature being greater than the first predefined temperature;
    wherein the second mode of operation is a pest killing mode that is not suitable for human occupants and the second predefined temperature is greater than or equal to 120 degrees Fahrenheit.

2. The method of claim 1, wherein the first mode of operation comprises a normal mode of operation suitable for human occupants and the first predefined temperature is less than or equal to 90 degrees Fahrenheit.

3. The method of claim 1, further comprising receiving from an override selector user input indicating a desire to operate in the first mode of operation or the second mode of operation, and wherein:
    the first mode of operation being selected by inserting and turning a key to a first position of the override selector; and
    the second mode of operation being selected by inserting and turning the key to a second position of the override selector.

4. The method of claim 1, further comprising receiving from an override selector user input indicating a desire to operate in the first mode of operation or the second mode of operation, and wherein:
    the first mode of operation is selected by entering a first code into a keypad of the override selector; and
    the second mode of operation is selected by entering a second code into the keypad of the override selector.

5. The method of claim 1, further comprising:
    receiving a signal from one or more temperature probes within the affected area while the second mode of operation is selected; and
    discharging heated air into the affected area until the affected area reaches a target temperature.

6. The method of claim 5, wherein the target temperature is greater than or equal to 120 degrees Fahrenheit.

7. The method of claim 1, wherein the housing is configured to be installed in an opening of an exterior wall of the affected area, the indoor chamber positioned on an interior side of the exterior wall, the outdoor chamber positioned on an exterior side of the exterior wall.

8. The method of claim 1, wherein:
    during the first mode of operation, limiting, by a first fuse, the electric current supplied to the one or more heating elements; and
    during the second mode of operation, limiting, by a second fuse, the electric current supplied to the one or more heating elements, the second fuse permitting more electrical current than the first fuse.

9. A method for killing pests in an affected area, comprising:
    during a first mode of operation, using a packaged terminal device comprising a housing having an indoor chamber and an outdoor chamber to generate a sufficient amount of heated air to heat at least a portion of the affected area to a temperature, less than or equal to a first predefined temperature, the first predefined temperature associated with a safety limit and comprising a maximum temperature suitable for human occupants;
    receiving, by a control unit, a user input indicating a desire to transition the packaged terminal device from the first mode of operation to a second mode of operation;
    transitioning the packaged terminal device to the second mode of operation;
    during the second mode of operation, drawing by a first fan positioned within the indoor chamber of the packaged terminal device, a first flow of air from the affected area into the indoor chamber of the housing;
    during the second mode of operation, drawing by a second fan positioned within the outdoor chamber of the packaged terminal device, a second flow of air from an area outside the affected area into the outdoor chamber of the housing; and
    during the second mode of operation, using the packaged terminal device to generate an additional amount of heated air to heat the at least the portion of the affected area to a temperature greater than or equal to a second predefined temperature;

wherein the second mode of operation is a pest killing mode that is not suitable for human occupants and the second predefined temperature is greater than or equal to 120 degrees Fahrenheit.

10. A method for killing pests in an affected area, comprising:
providing a packaged terminal device comprising a housing having an indoor chamber and an outdoor chamber, the housing configured to be positioned such that the indoor chamber is at least partially within an affected area and the outdoor chamber is at least partially outside the affected area, the packaged terminal device configured to:
operate a first fan positioned within the indoor chamber of the housing to draw a first flow of air from the affected area into the indoor chamber;
operate a second fan positioned within the outdoor chamber of the housing to draw a second flow of air from outside the affected area into the outdoor chamber;
generate, by one or more heating elements, heated air by transferring heat to the first flow of air from the affected area;
operate in a first mode in which the packaged terminal device is operable to generate sufficient heated air to heat at least a portion of the affected area to a temperature less than or equal to a first predefined temperature; and
operate in a second mode in which the packaged terminal device is operable to generate sufficient heated air to heat the at least a portion of the affected area to a temperature greater than or equal to a second predefined temperature, the second predefined temperature being greater than the first predefined temperature;
selecting, using an override selector of the packaged terminal device, the first mode such that the packaged terminal device may operate in the first mode when one or more occupants are present within the affected area;
selecting, using the override selector of the packaged terminal device, the second mode such that the packaged terminal device may operate in the second mode when the one or more occupants are not present within the affected area; and
in conjunction with the second mode, one or more temperature probes placed within the affected area communicate signals indicating temperature to the packaged terminal device such that the packaged terminal device may discharge the heated air into the affected area until the affected area reaches a target temperature that is greater than or equal to 120 degrees Fahrenheit.

11. The method of claim 10, wherein the first mode comprises a normal mode of operation suitable for human occupants and the first predefined temperature is less than or equal to 90 degrees Fahrenheit.

12. The method of claim 10, wherein the second mode is a pest killing mode that is not suitable for human occupants and the second predefined temperature is greater than or equal to 120 degrees Fahrenheit.

13. The method of claim 10, wherein:
the override selector comprises a lock; and
the first mode is selected by inserting and turning a key to a first position; and
the second mode is selected by inserting and turning the key to a second position.

14. The method of claim 10, wherein:
the override selector comprises a keypad;
the first mode Is selected by entering a first code into the keypad; and
the second mode is selected by entering a second code into the keypad.

15. The method of claim 10, wherein the affected area comprises a hotel room.

16. The method of claim 10, wherein the housing is configured to be installed in an opening of an exterior wall of the affected area, the indoor chamber positioned on an interior side of the exterior wall, the outdoor chamber positioned on an exterior side of the exterior wall.

17. The method of claim 10, wherein the affected area comprises a home.

18. The method of claim 10, wherein:
during the first mode, limiting, by a first fuse, an electric, current supplied to the one or more heating elements; and
during the second mode, limiting, by a second fuse, an electric current supplied to the one or more heating elements, the second fuse permitting more electrical current than the first fuse.

19. A method for killing pests in an affected area, comprising:
providing a packaged terminal device comprising a housing having an indoor chamber and an outdoor chamber, the housing configured to be positioned such that the indoor chamber is at least partially within the affected area and the outdoor chamber is at least partially outside the affected area, the packaged terminal device configured to:
operate a first fan positioned within the indoor chamber of the housing to draw a first flow of air from the affected area into the indoor chamber;
operate a second fan positioned within the outdoor chamber of the housing to draw a second flow of air from outside the affected area into the outdoor chamber;
generate, by one or more heating elements, heated air by transferring heat to the first flow of air from the affected area;
operate in a first mode in which the packaged terminal device is operable to generate sufficient heated air to heat at least a portion of the affected area to a temperature less than or equal to a first predefined temperature; and
operate in a second mode in which the packaged terminal device is operable to generate sufficient heated air to heat the at least a portion of the affected area to a temperature greater than or equal to a second predefined temperature, the second predefined temperature being greater than the first predefined temperature;
selecting, using an override selector of the packaged terminal device, the first mode such that the packaged terminal device may operate in the first mode when one or more occupants are present within the affected area; and
selecting, using the override selector of the packaged terminal device, the second mode such that the packaged terminal device may operate in the second mode when the one or more occupants are not present within the affected area;
wherein:
during the first mode, limiting, by a first fuse, an electric current supplied to the one or more heating elements; and during the second mode, limiting, by a second fuse, an electric current supplied to the one or more heating elements, the second fuse permitting more electrical current than the first fuse.

* * * * *